US006576330B1

(12) United States Patent
Schenck et al.

(10) Patent No.: US 6,576,330 B1
(45) Date of Patent: Jun. 10, 2003

(54) BORON NITRIDE PASTE COMPOSITION, BORON NITRIDE "SHELL" COATED CERAMIC STRUCTURE, AND PROCESS OF MANUFACTURING

(75) Inventors: Steven R. Schenck, Brighton, MI (US); Karl W. Dersch, Okemos, MI (US); Lloyd R. Chapman, Knoxville, TN (US); Cressie E. Holcombe, Jr., Knoxville, TN (US); William B. Webb, Oak Ridge, TN (US); Christopher W. Ivey, Powell, TN (US)

(73) Assignees: Rex Roto Technologies, Inc., Fowlerville, MI (US); Zyp Coatings, Inc., Oak Ridge, TN (US)

( * ) Notice: Subject to any disclaimer, the term of this patent is extended or adjusted under 35 U.S.C. 154(b) by 164 days.

(21) Appl. No.: 09/627,944

(22) Filed: Jul. 28, 2000

(51) Int. Cl.$^7$ ................................................. B32B 18/00
(52) U.S. Cl. .................... 428/293.4; 428/325; 428/332; 428/364; 428/401
(58) Field of Search ................................. 106/634, 632, 106/638, 623, 18.3, 18.13; 428/293.4, 325, 332, 364, 366, 401

(56) References Cited

U.S. PATENT DOCUMENTS

| | | | | |
|---|---|---|---|---|
| 3,804,701 A | | 4/1974 | Bognar ........................ 161/165 |
| 4,174,331 A | * | 11/1979 | Myles .......................... 260/29 |
| 4,248,752 A | * | 2/1981 | Myles ........................ 260/29.1 |
| 4,950,627 A | * | 8/1990 | Tokarz et al. .................. 501/95 |
| 5,053,362 A | * | 10/1991 | Chi et al. ...................... 501/95 |
| 5,268,031 A | * | 12/1993 | Lassites et al. ............. 106/634 |
| 5,573,580 A | | 11/1996 | Bartsch et al. ........... 106/38.27 |

* cited by examiner

*Primary Examiner*—Merrick Dixon
(74) *Attorney, Agent, or Firm*—Gifford, Krass, Groh, Sprinkle, Anderson & Citkowski, P.C.

(57) ABSTRACT

A fully inorganic boron nitride paste, containing 80 to 94% of a boron nitride paint and 6 to 20% of ceramic fibers, is provided to allow the process of manufacturing boron nitride "shell" coatings of 0.0313 to 0.25 inch onto ceramic substrates chosen from a wide range of densities. De-clumping of the ceramic fibers such that fiber lengths are greater than 100 micrometers and clumps are less than 3/32 inch improves boron nitride "shell" layer uniformity. Boron nitride content of greater than 36 wt. % (or about 50 vol. %) in the boron nitride "shell" provides ceramic structures with a matrix of boron nitride that provides long-term nonwetting behavior for molten nonferrous metals.

14 Claims, No Drawings

BORON NITRIDE PASTE COMPOSITION, BORON NITRIDE "SHELL" COATED CERAMIC STRUCTURE, AND PROCESS OF MANUFACTURING

TECHNICAL FIELD

This invention relates to the field of ceramic layering onto ceramic substrates for improving the resistance to attack from molten nonferrous metals.

BACKGROUND ART

Ceramic coatings have been used for many years to change the surface performance of refractory materials with molten nonferrous metals, such as aluminum and its alloys, magnesium and its alloys, and zinc and its alloys. These coatings often contain boron nitride, which has the characteristic of exhibiting nonwetting/non-stick properties with these molten metals and their drosses/slags. Generally, these coatings contain a high-percentage loading of boron nitride (up to 35% in the liquid coating and 62 to 92% in the dried or sintered coating). The coatings are usually applied by standard house painting techniques—brushing or air-spraying. Sometimes, dipping or roller-coating is used. The general methods provide a layer of mostly boron nitride, bonded with aluminum oxide, magnesium silicate, magnesium-aluminum silicate, aluminum phosphate, or other compatible binder. The thickness of these coatings is typically 0.003 to 0.010 inch (0.08 to 0.25 mm). Boron nitride powder used for these coatings is typically –325 mesh and often below 10 micrometers particle size with a surface area of 10 to 30 square meters/gram. The ceramic substrates that are painted with these coatings can be nearly fully dense refractories, but are often fibrous structures—such as vacuum-molded materials that are lightweight. The coatings are very versatile in allowing application to substrates of varying density and composition. The main problem with boron nitride coatings is that they are fairly soft materials. This characteristic results in eventual wear and erosion by molten metal moving across the coated surfaces. Coating removal leads to wetting and sticking of the dross and poor flow of the molten metal in troughs, launders and runners. In molds and other areas, the finish slowly worsens as the boron nitride wears away. This situation is remedied by often re-coating the ceramic components to reapply the boron nitride layer. However, recoating is a tedious, time-consuming, and expensive process.

One possible solution to the erosion problem would be to provide a thicker boron nitride coating. Unfortunately, thick coatings require thorough drying between applications or else moisture is retained in the undercoatings. Such residual moisture often leads to delamination or "pop-off" of the coatings when used for the first time. Thick coatings are also more susceptible to "mud-cracking" on drying which leads to the coating coming off of the substrate in poorly-attached areas. Another problem with thick boron nitride coatings arises from the thermal expansion differences between the substrate and the coating. Stresses arising from these thermal expansion differences become more pronounced with thicker coatings as they go through temperature changes, leading to spalling of the thick coatings. Thick coatings typically have less strength than thin coatings due to microcracking and low cohesive bonding. Additionally, applying a thick coating is time-consuming for the process worker.

Prior references that mention refractories containing boron nitride include U.S. Pat. No. 5,573,580 to Bartsch et al. and U.S. Pat. Nos. 4,248,752 and 4,174,331 to Myles. The former patent discloses a "refractory wash" coating stated as a "mould coating material" that may contain boron nitride hollow spheres preferably, or boron nitride fibers. It is generally known in the field that wash/mold coatings are intended for short-term uses, often one casting use. Neither boron nitride spheres nor fiber additions would lead to a boron nitride "shell" coated ceramic as our material. The coating of Bartsch is expected to have problems that occur with a simple thick coating, such as "mud-cracking," "pop-off" from moisture or microcracking or thermal expansion differences with the substrate. An erosion-resistant nonwetting layer would not occur with the coating of Bartsch, if the boron nitride were used in the form of spheres or fibers, since erosion of soft boron nitride is the reason for the short lifetimes of boron nitride coatings. Additionally, such spheres or fibers of a soft material like boron nitride would not be expected to improve the strength of his coating material. Bartsch also mentions that spheres/fibers melt and crumble when they come in contact with molten metal, thereby limiting the utility of his coating to short term usage.

The moldable material defined by the patents of Myles was designed for adherence to a steel sub-surface. Also, they contain a necessary ingredient of colloidal silica in the range of 7 to 30%, which is known to be highly reactive with molten nonferrous metals, causing wetting and reaction with the metals. Neither Myles or Bartsch were concerned with a "shell" layer formed on top of a ceramic structure, said "shell" consisting of a matrix of boron nitride which contains a non-boron nitride fiber. Bartsch, in fact, discourages using fibers of any sort due to the difficulty of getting a uniform, smooth layer when fibers are used. Also, there was no effort to achieve the true nonwetting behavior that is desirable with a layer of boron nitride. Myles teaches a very thick composite structure of 1 to 3 inches thickness.

Other patents that discuss various moldable or pumpable compositions that could also contain boron nitride fibers are U.S. Pat. No. 5,053,362 to Chi et al. and U.S. Pat. No. 5,268,031 to Lassiter et al. Chi defines a moldable, clay-like filler that is directed to patching and filling of large holes, typically over 1 inch in thickness, in refractory materials—to add thermal insulation and thus fix hot spots from furnace liner deterioration. Such a filler is placed into gaps between materials, and thus considerations of delamination, "pop-off," etc. are not a concern with this moldable filler. A necessary ingredient as per Chi is an organic polymer binder, preferably used with chopped fibers and colloidal silica binder. Lassiter et al. describes a pumpable composition, designed for thermal insulation, with the primary distinction of having improved freezing resistance due to the required usage of sodium silicate binder. The pumpable material of Lassiter et al., like the moldable material of Chi et al., is intended for being used to fill "cavities" in furnace walls etc.—thus again eliminating considerations of delamination, "pop-off," etc. that are required to be addressed with a "shell" coating onto a ceramic surface. Also, Lassiter et al. requires a polymer organic component. Thus, the pumpable material of Lassiter would be expected to react readily with molten aluminum, magnesium, and other nonferrous metals due to the presence of sodium silicate binder.

Also, JP 63157747A to Ando et al. utilizes boron nitride as an oxidizing prevention layer on a laminate material with graphite and a ceramic fiber layer—not a matrix of boron nitride which has ceramic fibers added to improve strength and erosion resistance in a boron nitride "shell" coated ceramic structure.

It is well known that silicon dioxide, or silica, is reactive with molten aluminum, magnesium, and other nonferrous metals, as noted in U.S. Pat. No. 5,053,362. Whether in powder form or in colloidal form, such silica additions are the basic cause for corrosion and deterioration of refractories that contact molten nonferrous metals. Also, such binders as alkali silicates, including sodium, potassium, or lithium silicates in particular, are known to allow rapid reaction and deterioration in contact with molten nonferrous metals—as well as allowing wetting of the refractory surface by these nonferrous metals. Molten nonferrous metals will typically reduce silica in the refractory to silicon, which can then dissolve into the molten metal. Concurrently, the nonferrous metal oxidizes (e.g. transforming it to the corresponding oxide such as alumina, magnesia, or a spinel, depending on the metal) and can attach to, and react further with, the refractory. Boron nitride provides a smooth surface that is not reacted with or wetted by molten nonferrous metals. However, it is quite important to minimize the level of any silicon dioxide containing material that is present along with the boron nitride in order to reduce or prevent any reaction and deterioration that is characteristic of the silicates and silica-containing refractories.

None of these references appreciate the need that exists for a boron nitride "shell" coated ceramic structure where the "shell" consists of a matrix of boron nitride with a strengthening material/filler being ceramic fibers.

SUMMARY

The present invention provides a boron nitride paste composition composed of boron nitride powder dispersed in a fully inorganic, non-silicon dioxide binder into which ceramic fibers are added in order to allow a moderately thick boron nitride "shell" layer to be bonded to ceramic substrates of different density, composition, and shapes. The layer thickness of the boron nitride "shell" material is typically 0.0313 inch to 0.25 inch (0.8 mm to 6.4 mm), which provides a long-lasting, non-wetting/non-stick boron nitride surface for molten nonferrous metals. The preferred composition of the boron nitride paste contains 91% boron nitride paint and 9% ceramic fibers, where the fibers initially are in the dimensional range of up to 4 inches (10 cm) in length and 2 to 3 micrometers ($\mu$m) average diameter but are de-clumped such that the average fiber length is greater than 100 micrometers and the clumps are less than 3/32 inch (0.24 cm) in diameter. The concentration of the boron nitride in the dried "shell" layer is typically in the range of 36 to 78 wt. %, and preferably in the range of 45 to 70 wt. %, providing the nonwetting performance of the moderately thick surface layer. The fibers provide internal reinforcement of the layer, allowing thorough drying without cracking when the layer is built up onto the ceramic, strengthening the layer, improving erosion resistance with molten nonferrous metals, as well as decreasing the thermal expansion mismatch stresses between substrate and the layer.

The standard methods of applying this boron nitride paste to a ceramic substrate are troweling it onto the substrate or dipping the ceramic material into the boron nitride paste. Then, the layer of paste can be evenly smoothed out with an accurately-spaced blade, a process which can be mechanized depending on part geometry. After drying the layer in air at around 100° C., it can be burnished/buffed—densifying it somewhat and smoothing it as well as improving its aesthetics. The dried boron nitride "shell" coated ceramic can be placed directly into use-environments that will further densify the ceramic and further bond the boron nitride "shell" layer onto the substrate ceramic. The dried boron nitride "shell" coated ceramic can also be heated up (fired/sintered) prior to placing in service. The ceramic substrate material can be vacuum molded ceramic fiber shapes in an unsintered or sintered state. Much denser ceramic fiber shapes can similarly be used as a substrate. Also, nonfibrous, porous, or dense unsintered or sintered ceramics can be used as the ceramic substrate. Even ceramic substrates not normally considered for contact with molten nonferrous metals can be used due to the superior nonwetting properties of the boron nitride "shell." The combination of substrate and boron nitride "shell" significantly increases the performance and durability in molten nonferrous metal contact application when compared to the substrate alone.

DESCRIPTION OF THE PREFERRED EMBODIMENTS

According to the present invention, a boron nitride paste composition is provided that has advantages over standard coatings of the prior art. The boron nitride paste of the present invention is designed to provide a thick layer of mostly boron nitride matrix so that re-coating of the ceramic is basically unnecessary. It should be noted that having a "matrix" of boron nitride means having at least approximately 50 volume percent of boron nitride based on the amount of solid phases present, ignoring any porosity present. With alumina as the balance of the dried coating, this gives 36 wt. % boron nitride and 64 wt. % alumina based on the theoretical density of alumina being 3.97 g/cc and that of boron nitride being 2.25 g/cc. Having a matrix of boron nitride is necessary for the nonwetting behavior of boron nitride to predominate.

The thickness of the dry boron nitride coatings is at least 0.0313 inch. Thicknesses of 0.25 inch have been successfully prepared. Economics and production difficulties make 0.25 inch a practical limit for the layer thickness. Preferably, the thickness is between 0.0625 and 0.15 inches. Thus, the boron nitride layer provides a nonwetting/non-stick layer that can be used for extended periods of time as compared to the standard coatings of the prior art. The coated ceramic components act essentially as monolithic composite bodies with a conventional refractory material interior and a moderately thick boron nitride-based working surface "shell."

The present invention provides a boron nitride paste composition composed of boron nitride powder dispersed in a fully inorganic, non-silicon dioxide based binder, said paste amenable to being applied in thicknesses of 0.0313 to 0.25 inch as a thick, bonded layer that will not crack on drying or on applying to a variety of ceramic substrates of differing densities from nearly fully dense to highly porous. Additionally, the present invention provides a boron nitride paste that has a spreadable consistency (similar to handcream) and will dry quickly and bond well to itself and to a ceramic substrate on drying or when heated to use-temperatures of up to 2000° F.

A boron nitride "shell" coated ceramic results with a long-lasting boron nitride layer, such that recoating is unnecessary for periods of time up to several months as compared to days or even hours with standard boron nitride coatings.

The present invention further provides a process for manufacturing a boron nitride "shell" coated ceramic by applying the boron nitride paste to ceramics of differing densities, compositions, and shapes.

In order to improve nonwetting and prevent reactions with molten nonferrous metals, the present invention preferably limits the use of silica or silicates in the boron nitride layer.

In order to allow moderately thick layers of a boron nitride material to be built up onto ceramic substrates of various porosity, from nearly fully dense ceramics to highly porous ceramic insulation material, the layer needs to be strengthened internally. The internal strengthening needs to provide a structural integrity of the layer as well as being compatible with the boron nitride and with the substrate, while not deteriorating the performance with molten nonferrous metals and their associated slags or drosses. Particularly, in order to achieve the good nonwetting behavior with molten nonferrous metals, binders and additions containing any type of silicon dioxide, powder or colloidal, or alkali silicates should not be used, since these tend to enhance wetting and reaction with molten nonferrous metals. Additionally, it is necessary for any material used for strengthening not to deteriorate the surface appearance and not to cause excessive surface roughness which can lead to poor liquid metal flow over the surfaces.

As used herein "highly porous" in regard to a ceramic substrate means at least 80% porosity as measured by mercury porosimetry; "porous" means between 15% and 80% porosity; and "nearly fully dense" means having a porosity of less than 15%.

Experiments were conducted with a paint of boron nitride powder dispersed in a liquid of peptized aluminum oxide monohydrate. Peptizing is illustratively detailed in U.S. Pat. No. 4,314,827 and U.S. Pat. No. 5,320,989. Boron nitride powder dispersed in the aluminum oxide binder peptized with nitric acid is a mixture that is clay-like in the sense that it acts like a ceramic slip or paste. The amounts of aluminum oxide binder peptized with nitric acid can be varied, such that the boron nitride content of the dried paint is varied from 62 to 92 wt. %. The boron nitride content of the solvated paint is varied from 8 to 35%. A major advantage of the present invention is that the binder is a fully inorganic, non-silicon dioxide containing material and thus will not be rapidly attacked by molten nonferrous metals. Also, since the binder is fully inorganic, it contains no organic bonding agents that can cause porosity and disruption on burnout from heating in air environments. It is appreciated that the binder system is also optionally peptized with other mineral acids such as hydrochloric acid. Likewise, other binders that are based on aluminum oxide or compounds with aluminum oxide or precursors to aluminum oxide, such as colloidal alumina or aluminum phosphate, are similarly operative herein. Binders which are non-silicon dioxide or which have minimal reactivity with molten nonferrous metals could also be utilized.

To the above detailed boron nitride paint, additions of coarse grained boron nitride, aluminum oxide, or the like referred to herein as "grog" were tried and applied to several ceramic substrates. The results indicated that some improvement occurred in obtaining thicker layers of 0.0313 to 0.25 inch (0.8 to 6.4 mm), but thick layers were generally quite weak within the layer as well as being poorly bonded to ceramic substrates. Additionally, severe "mud cracking" occurred when grog was used.

Unlike "grog," additions of various ceramic fibers of differing compositions and lengths allowed thicker/stronger boron nitride coatings to be made. The composition of the ceramic fibers did not seem to affect the behavior of the paste when pure aluminum oxide fibers and various alumina-silica fibers from around the composition of $Al_2O_3.2SiO_2$ to the "mullite" composition of $3Al_2O_3.2SiO_2$ were used. Alumina-silica fibers did not cause extensive deterioration or reaction with molten nonferrous metals, since the boron nitride nonwetting behavior to some extent prevents the molten nonferrous metals from penetrating into the layer and attacking the fibers. Also, since silica is combined in the compounds as an aluminosilicate, there is less reactivity with molten nonferrous metals than in the case of free silica or high-silica refractories. Other high-temperature ceramic fibers that have minimal reactivity with molten nonferrous metals would be expected to be operative herein; examples include calcium or magnesium silicate fibers. Preferably alumina-silica fibers are used herein.

A preferred initial fiber size as determined by the texture and bonding characteristics includes fibers of up to 4 inches in length and 2 to 3 micrometers average diameter. More preferably "washed" fibers are utilized in the present invention, these fibers a bulk fiber of the type designated as "Fiberfrax Washed Fiber" (Unifrax Corporation). Boron nitride paste made from "washed" ceramic fibers produced a smoother surface finish and was easier to trowel out when compared to paste made from "unwashed" fibers, primarily due to the partial removal of the unfiberized material that is present in unwashed fibers. Typically, ceramic fibers are obtained as an entangled mat necessitating de-clumping prior to dispersion in a paste according to the present invention. It is appreciated that ceramic fibers of other dimensions are operative herein including those with diameters from 1 to 20 micrometers, as long as the fiber lengths are greater than 100 micrometers.

To prepare the paste of this invention, bulk fiber material is blended in the range of 6 to 20 wt. % of refractory ceramic fibers into a boron nitride liquid paint which has from 8 to 35 wt. % boron nitride in the solvated paint resulting in a paste containing 6 to 33 wt. % boron nitride. Aluminum oxide peptized with nitric acid is normally used for the binder, such that the concentration of aluminum oxide in the binder is typically around 5 wt. % of the binder liquid. When "shell" layers are produced from this combination of ingredients, the concentration of the boron nitride in the dried "shell" layer is typically in the range of 36 to 78 wt. % and preferably in the range of 45 to 70 wt. %. The lower level of 36 wt. % is that which will form a matrix of boron nitride. The preferable range is derived from using boron nitride liquid paint that has 23.5 wt. % boron nitride in the solvated paint; this paint was used because of it being good for dispersing the ceramic fibers.

Initially, fibers hand-blended into the boron nitride coating avoided disrupting the fibers yet effectively de-clumped them so as to facilitate a final smooth surface and overall performance. Hand separation allows the clumping to be reduced but is not amenable to production. Without efficient de-clumping, the boron nitride coating exhibits diminished long-term performance. If the clumps are not adequately dispersed, then the resulting surface is rough and therefore difficult to smooth without pulling out clumped material. Pulling out of fiber clumps tends to form pits and leads to further surface roughening. Additionally, if the fibers are not uniformly dispersed into the mixture, there will be fiber-deficient and fiber-rich areas in the final "shell" coating. The fiber-deficient areas lead to "mud-cracking" on drying. Those areas which are fiber-rich are more prone to attack by the molten nonferrous metals, since the boron nitride is not present in sufficient amount to yield the nonwetting behavior that prevents the molten nonferrous metals from corroding/chemically attacking the fibers.

A second technique for reducing fiber clumps is to force the paste through a screen with openings of about ⅙ of an inch, thus breaking up the fiber clumps. More preferably, food grinder processing using a Kitchen Aid 4½ Quart Ultra Power Mixer, Model KSM 90 PS with FGA-2 Food Grinder gives good dispersion and de-clumping of the fibers while not excessively breaking up the fibers. This technique similarly forces the paste through a "coarse" plate with a rotating blade, eliminating clumps of fibers that are over approximately 3/32 inch (2.4 mm) in size. The food grinder at low speed (Setting 1) does not lead to uniform composition of the paste. The food grinder setting for highest speed (Setting 10) gives good dispersion and de-clumping of the fibers while not excessively breaking up the fibers. Other de-clumping techniques such as high-speed, high-shear mixers (such as a typical household blender, like the Hamilton Beach/Proctor-Silex Inc. Model 50220, Type B-12) or low-speed, low shear mixers such as the Kitchen Aid mixer above without the food grinder) are not as effective as the food grinder for dispersion and de-clumping of the ceramic fibers. High-speed, high-shear dispersion techniques break up the fibers too much, leading to microcracking and "mud-cracking" when a boron nitride "shell" coated ceramic is prepared. When addition of a higher volume percentage of fibers was attempted to compensate for the breaking of the fibers due to the high-speed, high-shear mixing, the cracking-on-drying problems were reduced; but such high loadings reduce the nonwetting behavior of the boron nitride matrix because of the overall volume percentage reduction of boron nitride in the "shell" coating. Such higher loading thus leads to more corrosion and deterioration when the "shell" coating is placed in the use-environment of molten nonferrous metals. Low-speed, low-shear mixing does not uniformly blend the fibers into the paint, thus leading to a nonuniform composition of the paste.

Solving the clumping problem requires that clumps be held to less than about 3/32 inch (2.4 mm) in order to be adequately dispersed into the boron nitride paste, thus establishing an approximate upper fiber length of about 0.094 inch such that a clump will not form over about 0.094 inch in diameter when processed into a boron nitride coating.

At fiber loading of less than 5 wt. % a thick shell layer could not be produced. Cracking within the layer occurred during drying, apparently from excessive shrinkage of the thick boron nitride paste. Typically, fiber loading for a solvated paste according to the present invention is from 6 to 20%. Preferably, the fiber loading is from 7.5 to 15%. More preferably, the amount of fibers is about 9 wt. %. Levels above 20 wt. % lead to unmanageable paste, and levels from 16 to 20% allow a coating shell to be produced, although weaker-bonded and with increased wetting and attack by molten metals.

The preferred boron nitride paste thus contains about 9 wt. % alumina-silica fibers of typical starting dimensions of up to 4 inches in length and 2 to 3 micrometers average diameter which are de-clumped such that the fibers are above 100 microns in length and the clumps are less than 3/32 inch in diameter.

The preferable boron nitride coatings were within the dried composition range of 45 to 70 wt. % of boron nitride and 19 to 48 wt. % of ceramic fibers and 7 to 12 wt. % of aluminum oxide. This dried material results from using boron nitride liquid paint that has 23.5 wt. % boron nitride in the solvated paint, and with 6 to 20% of ceramic fibers added to the liquid paint. A somewhat more preferable composition has a dried composition within the range of 52 to 66 wt. % boron nitride, 23 to 39 wt. % of ceramic fibers, and 9 to 11 wt. % of aluminum oxide. This dried material results from using the same boron nitride liquid paint but with 7.5 to 15% of ceramic fibers added to the liquid paint.

In application, it is difficult to determine when or if the boron nitride layer has been removed in service, since most ceramic substrates and the boron nitride shell coating are typically both white in appearance. Thus, a refractory pigment is preferably added to the boron nitride paste of the present invention. There are numerous ceramic pigments used as colorants. These are generally based on transition metal compounds that give rise to the color. Properly selected, a refractory pigment should have minimal reactivity with molten nonferrous metals and should maintain its color after exposure to service temperatures. A pigment according to the present invention is between about 0.5 to 2.5% based on the total weight of the paste. Preferably, a level of about 1 wt. % of refractory pigment is utilized herein. A yellow-gold pigment, such as "10415 YELLOW" from Cerdec Corporation is a preferred colorant; this material is listed as a "mixed metal oxide" containing compounds of antimony, chromium, and titania.

In order to assure uniform adherence of the preferred paste to the ceramic substrates, it is desirable, especially on porous substrates, to first prewet the surface with water or any compatible binder but preferably with a nonsilicon dioxide based binder, one such binder being peptized aluminum oxide monohydrate liquid. This pre-wetting with water or the binder alone before applying the preferred paste was shown to aid the adherence of the paste to ceramic substrates, varying from nearly fully dense to those of the highly porous insulating variety. The pre-wetting step leads to better overall bonding as well as aiding the ability to smooth out the final boron nitride "shell" coating without disrupting the "shell" coating. Furthermore, with fibrous or porous ceramic substrates, the paste has a tendency to dry out, making it more difficult to obtain a uniform/smooth "shell." Prewetting with binder, or even with water, significantly improves working time and ease of paste application.

The preferred paste was also shown to have problems with surface roughness, adherence, cracking, etc. unless the ceramic bulk fibers were of diameters in the range of 1 to 20 micrometers and lengths of greater than 100 micrometers with clumps less 3/32 inch (2.4 mm). Fiber diameters averaging 2 to 3 micrometers and up to 4 inches in starting length before de-clumping were shown to be acceptable for preparing the paste. When fibers of dimensions below 100 micrometers in length or when fine, powder-like fibers were used with the preferred paste composition, "mud-cracking" occurred on drying, confirming the importance of fiber dimensions.

Boron nitride paste is readily applied through a variety of techniques including swabbing the thick paste onto the substrate, thorough drying, and then lightly sandpapering the surface to give a fairly smooth layer, dipping and spraying. Preferably paste is applied by spraying. More preferably spraying is accomplished with an air sprayer similar to those used to apply plaster. Most preferably, rollers are used to smooth the wet spray applied paste.

A preferred method for applying the boron nitride paste to small, cylindrical parts includes first troweling the boron nitride paste onto the interior surface of the ceramic parts, the wet material then formed using a lathe with an evenly-spaced blade which matches the interior contour of the part. After drying at 75° to 120° C., with the preferred temperature being 100° C., light buffing, polishing, burnishing, or machining is optionally performed. The boron nitride "shell" coating can be applied to an unsintered or sintered ceramic body. In either case, heating the structure up to a temperature above 500° C. before or during actual service of the parts in the nonferrous metal industry further bonds the boron nitride coating onto the ceramic substrate.

In actual applications with molten metal, the flow of the metal was greatly improved with the present invention compared to uncoated ceramic components. The lifetime observed for the boron nitride "shell" coated ceramic parts according to the present invention was several months compared to hours or a few days at best for traditional boron nitride paint-applied coatings onto the same ceramic surfaces. Additionally, the inventive boron nitride coating had an aesthetic appearance, and a yellow-gold color distinguishing the coating from the typical white ceramic surfaces. Therefore, it is immediately visually apparent that the boron nitride coating of the present invention is present as a shell layer on the ceramic due to its yellow-gold color. If the color was absent, it would be an instant visual indication that the coating had won down and that the ceramic should be replaced for optimum nonwetting performance.

Boron nitride "shell" coated ceramic structures/ components using the preferred paste were field tested with flowing molten aluminum for 60 days with intermittent contact of the boron nitride layer by molten aluminum, which was held at around 1300° F. (705° C.). Standard uncoated silicate-based porous ceramic structures with molten aluminum were tested at the same temperature and operating conditions, and were determined to react and wet, within a few hours to a few days at best. These field tests indicated that the fiber addition according to the inventive coating does not lead to rapid reaction at the levels required for forming the shell coating. Additionally, these production field tests showed excellent performance of the boron nitride "shell" layer, with uniform, smooth flow of the molten aluminum during the tests, and maintaining a nonwetting and/or non-stick surface. Further testing showed that standard-design casting parts with the boron nitride "shell" coating operated continuously for over 1 to 2 month time periods without any visible degradation in appearance.

The behavior of the boron nitride "shell" coating/ceramic substrate, when the ceramic substrate is a porous, ceramic fibrous material, is like a monolithic ceramic. The boron nitride "shell" coating expands and contracts uniformly with the underlying ceramic, so that the heating-cooling cycles do not cause delamination or separation of the boron nitride coating. This behavior as a unit allows the substrate ceramic to act as a boron nitride ceramic for many applications. Additionally, near-fully dense, porous, fibrous, highly-porous and insulating ceramics or other refractory materials are operative herein as substrate material. This enables tailoring the performance of the unit-material. For example, a system with high heat conduction is designed by choosing a nearly fully dense ceramic substrate with a high thermal conductivity. Conversely, a highly insulating system can be designed by choosing a porous insulating ceramic substrate, even though the boron nitride layer itself has high thermal conductivity which is comparable to that of stainless steel. These characteristics allow a thermal systems designer flexibility when considering casting molds, troughing, funnels, and other metal transport or containment means.

It is appreciated that a boron nitride paste is provided herein that yields a "shell" boron nitride coating applicable to almost any type of ceramic/refractory substrate—thus eliminating the need for reapplying/re-coating the boron nitride coatings that are generally in use, yet providing the same type of nonwetting and/or non-stick behavior in contact with molten nonferrous metals and other materials. Also, the process of manufacturing this boron-nitride "shell" coated ceramic structure provides a way of producing a great variety of ceramic components, while providing an aesthetically pleasing and smooth, uniform surface of boron nitride. The boron nitride "shell" coated ceramic structure is a long-lasting material that provides true nonwetting with molten nonferrous metals at use-temperatures in air environments of up to about 2000° F. (1095° C.). In vacuum, use of the boron nitride "shell" coated ceramic is limited by the vapor pressure of the boron nitride, with a practical use-temperature limit of around 2550° F. (1400° C.). In inert atmospheres like argon or nitrogen, the use-limit is established by the sublimation of boron nitride at around 3275° F. (1800° C.). The practical use-limit for the boron nitride "shell" coated ceramic is also influenced by the use temperatures of the fibers that are utilized, generally being 2300° F. (1260° C.) for certain alumina-silica compositions to as high as 2800° F. (1540° C.) to 3000° F. (1650° C.) or so for high-alumina "mullite" or pure aluminum oxide fibers.

While this shell coating of boron nitride is directed towards ceramic substrates, it is recognized that the present invention is also applicable to certain metallic substrates. These illustratively include but are not limited to steel, cast iron, and aluminum.

Additionally, while the shell coating of boron nitride is fully inorganic, it is recognized that organic additives can be optionally utilized provided that they are compatible with the other ingredients.

All references and patents cited herein are representative of the state of the art. Each reference and patent entered herein is hereby incorporated by reference to the same extent as if each reference was specifically incorporated by reference.

While a preferred embodiment has been shown and described, it will be understood that it is not intended to limit the disclosure, but rather it is intended to cover all modifications, alternate methods and equivalents falling within the spirit and the scope of the invention as defined in the appended claims.

What is claimed is:

1. A boron nitride coated ceramic structure comprising a dry coating having a thickness, the coating applied to a ceramic substrate, wherein the coating comprises 36 to 78 weight percent boron nitride powder, ceramic fibers, and an inorganic binder.

2. The structure of claim 1 where the boron nitride coating has a thickness of between 0.0313 and 0.25 inches.

3. The structure of claim 1 further comprising a ceramic pigment in the boron nitride coating.

4. The structure of claim 1 herein the dry ceramic pigment is present from 0.5 to 2.5 wt. %.

5. The structure of claim 1 wherein the said ceramic substrate is selected from the group consisting of: porous ceramics, ceramic fiber materials, near-fully-dense ceramics, and high-porous insulating ceramics.

6. The structure of claim 1 wherein ceramic substrate is an unsintered ceramic.

7. The structure of claim 1 where the non-boron nitride ceramic substrate is a sintered ceramic.

8. The structure of claim 1 wherein said ceramic fibers are selected from the group consisting of: alumina fibers, alumina-silica fibers, and combinations thereof.

9. The structure of claim 1 wherein said ceramic fibers have an average diameter of 2 to 3 micrometers.

10. The structure of claim 9 wherein said ceramic fibers are over 100 micrometers in length with clumps that are less than 3/32 inch in diameter.

11. A boron nitride coated ceramic structure comprising a dry coating having a thickness, the coating applied to a ceramic substrate, wherein the coating comprises: 45 to 70 weight percent of boron nitride; 19 to 48 weight percent of ceramic fibers; and 7 to 12 weight percent of an inorganic binder.

12. The structure of claim 11 wherein said ceramic fibers are selected from the group consisting of: alumina fibers, alumina-silica fibers, and combinations thereof.

13. The structure of claim 11 wherein said ceramic fibers have an average diameter of 2 to 3 micrometers.

14. The structure of claim 13 wherein said ceramic fibers are over 100 micrometers in length with clumps that are less than 3/32 inch in diameter.

* * * * *

UNITED STATES PATENT AND TRADEMARK OFFICE
CERTIFICATE OF CORRECTION

PATENT NO.   : 6,576,330 B1
DATED        : June 10, 2003
INVENTOR(S)  : Steven R. Schenck It is certified that error appears in the above-identified patent and that said Letters Patent is hereby corrected as shown below:

<u>Title page,</u>
Item [56], References Cited, insert Heading FOREIGN DOCUMENTS, after last cited U.S. PATENTS DOCUMENTS, and insert:
-- JP 363157747A   6/88 --.

<u>Column 10,</u>
Line 44, replace "1" with -- 3 --.

Signed and Sealed this

Twenty-seventh Day of January, 2004

JON W. DUDAS
*Acting Director of the United States Patent and Trademark Office*